May 2, 1944.   J. W. MYERS   2,347,707
ELECTRICAL COOKING APPARATUS
Original Filed Feb. 24, 1941
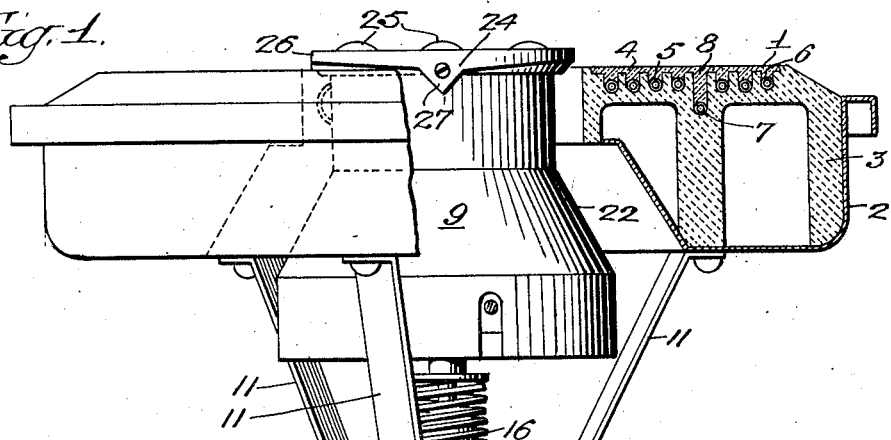
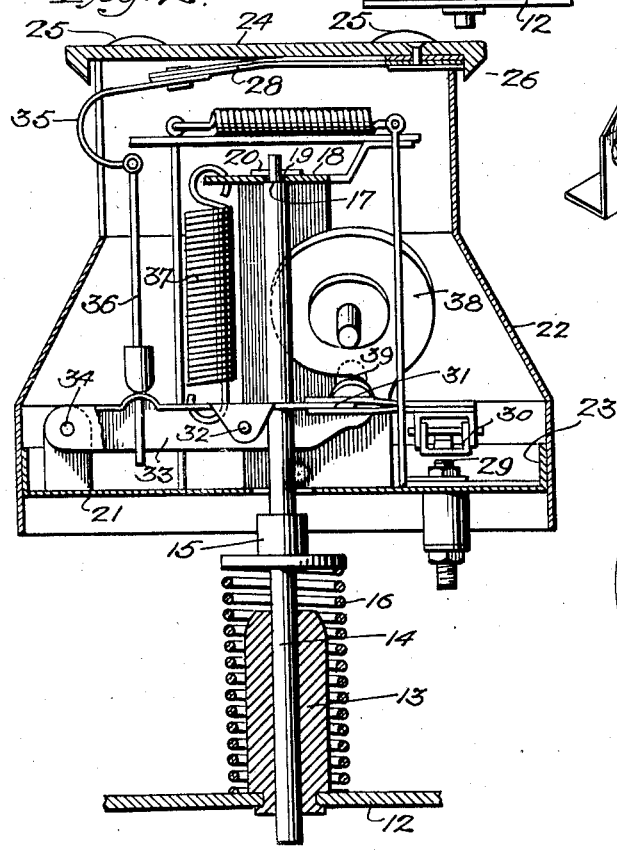
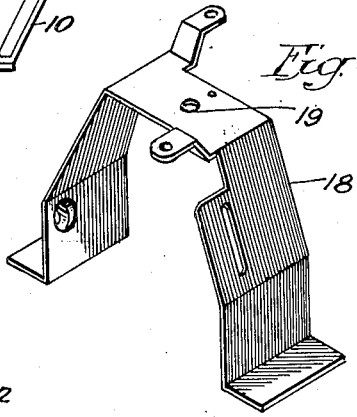
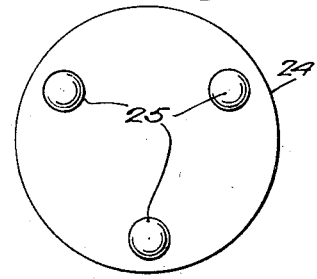
Inventor
Joseph W. Myers.
by his Attorneys
Howson & Howson Patented May 2, 1944

2,347,707

UNITED STATES PATENT OFFICE 2,347,707

ELECTRICAL COOKING APPARATUS

Joseph W. Myers, Philadelphia, Pa., assignor to Proctor & Schwartz, Inc., Philadelphia, Pa., a corporation of Pennsylvania Original application February 24, 1941, Serial No. 380,341. Divided and this application February 3, 1942, Serial No. 429,423

7 Claims. (Cl. 219—37)

This invention relates to electrical cooking apparatus, and more particularly to a novel control apparatus for an electric surface-type cooking unit for electric ranges and the like. This application is a division of application Serial No. 380,341, filed February 24, 1941.

The present invention is directed generally to the type of control apparatus disclosed and claimed in the Myers and Roesch Patent No. 2,140,479, granted December 13, 1938. In the said patent, there is disclosed a control device comprising an adjustable thermostatic switch which is controlled by the temperature of a cooking vessel placed on the cooking unit with which the said device is associated. To effect such control, the said device is arranged so as to be directly engaged by a cooking vessel.

One object of the present invention is to provide a device of this character embodying novel means for assuring uniform affectation of the cooking vessel upon the thermostatic control device.

Another object of the invention is to provide a control device of this character so arranged that it may adjust itself to the contour of the bottom of the cooking vessel, and having a plurality of spaced protuberances for assuring uniform thermal contact with the cooking vessel.

A further object of the invention is to provide a novel construction wherein provision is made for preventing grease or other substances from creeping into the thermostatic control mechanism.

Other objects and features of the invention will appear hereinafter.

In the accompanying drawing,

Fig. 1 is an elevational view of a surface-type cooking unit and an associated control device constructed according to the invention, a portion of the cooking unit being shown in section to illustrate the construction thereof;

Fig. 2 is a sectional view of the control device alone;

Fig. 3 is a perspective view of the supporting yoke of the control device; and

Fig. 4 is a face view of the vessel-engaging plate of the device.

Referring first to Fig. 1, there is shown an annular surface-type cooking unit 1 which comprises a metal receptacle or container 2, an annular refractory body 3 having a spiral surface groove therein to accommodate the heating element or elements, and one or more heating elements disposed in the said grooves and covered by means of refractory cement 4. The heating element preferably comprises two main sections 5 and 6 and an auxiliary low wattage section 7. As illustrated, one of the main sections of the heating unit, i. e. the section 5, may be disposed in the inner part of the spiral surface groove of the supporting body 3, while the other main section 6 may be disposed in the outer part of the spiral surface groove. Preferably, the auxiliary low wattage section 7 is disposed in a deep groove 8 in an intermediate position. The particular construction of the heating unit, however, is not important in this application, and the illustrated structure is intended merely to represent any suitable heating unit.

The control device designated generally by reference character 9 is supported by means of a bracket 10 having legs 11 secured to the underside of the cooking unit. As shown in Fig. 2, the base plate 12 which forms an integral part of bracket 10 carries a stationary sleeve 13 through which a rod 14 extends centrally of the control device. The rod 14 has mounted thereon a flanged collar 15. A helical spring 16 surrounds sleeve 13 and rod 14 and is disposed between the plate 12 and the flanged collar 15. The control device is supported as a unit by means of this resilient mounting.

The upper end of rod 14 is diminished in diameter and is provided with a shoulder 17 upon which a yoke 18 (see Fig. 3) is freely suspended. To this end, the yoke 18 has an aperture 19 of larger diameter than the upper end of rod 14, so that the yoke seats loosely on shoulder 17 and may adjust itself laterally in any direction for a purpose to be described presently. A cotter key 20 may be employed to prevent the yoke from becoming detached from the rod 14.

The lower outwardly turned ends of yoke 18 are secured to a plate 21 which constitutes a supporting base for certain elements of the device. A casing or housing 22 is removably secured to the upturned outer edge 23 of plate 21. A relatively thick metallic plate or disc 24 closes the top of the housing and is permanently secured thereto. The plate 24 serves as the medium through which heat is derived from the bottom of a cooking vessel placed on the cooking unit 1 and is preferably formed of aluminum because of its high thermal conductivity. In the absence of a cooking vessel, the spring 16 urges the unitary control device upward so that the plate 24 is disposed slightly above the surface of cooking unit 1, as shown in Fig. 1. When a cooking vessel is placed on the cooking unit, the weight of the vessel depresses the unitary device against the action of spring 16. In this way, it is assured that the plate 24 shall always engage a cooking vessel placed on the cooking unit.

As previously mentioned, an important feature of the invention is the provision of means for assuring a uniform affectation of any cooking vessel upon the control device. It is well known that the bottoms of cooking vessels are apt to vary one from another. For example, the bottom of one vessel may be concave or it may be convex or it may be deformed by rough usage. To compensate for these and other variations in contour of cooking vessel bottoms, the control device is made self-adjusting on the supporting rod 14 by means of the loose mounting of yoke 18 above described, and there are provided on the upper surface of plate 24 a plurality of protuberances 25. Preferably, there are three button-like protuberances so that the control device contacts the bottom of the cooking vessel in three places only. By virtue of the self-adjusting feature and the three-point contact arrangement, it is assured that the control device shall always engage the bottom of a cooking vessel in the same way, and, therefore, the influence of the temperature of the cooking vessel upon the control device is always uniform.

It will be noted that the suspension point for the control device is located near plate 24. This provides a greater degree of freedom of movement about that point, since it will be evident that the friction at that point is less than would be the case if it were located further from plate 24.

As shown in Figs. 1 and 2, the circumferential portion of plate 24 has a downwardly extending flange 26; which is formed so as to provide a plurality of spaced pointed projections 27, and the portions of the flange between these projections are beveled and inclined downwardly toward the projections 27 to provide runways along which any liquid substance may run toward the projections. As will be well understood, such construction will promote the formation of drops, that is it will cause a liquid substance to concentrate and run to the pointed ends of projections 27 and drip from the projections in the form of drops. Thus the specially constructed flange 26 acts as a grease remover and prevents grease from diffusing over the inside surface of plate 24 and getting onto the operating parts of the thermostatic control device.

The operation of the control device in accordance with the temperature of the bottom of a cooking vessel placed on the cooking unit, is effected by means of a thermostatic element 28 (see Fig. 2) in the form of a bi-metallic strip secured to the underside of plate 24. This thermostatic element is directly affected by the heat conducted from the cooking vessel bottom through the heat-conductive plate 24.

The detailed structure and operation of the control device form no part of the present invention but are fully illustrated and described in the above-mentioned parent application to which reference may be had, if desired. Fig. 2 shows certain elements of the structure but is not intended to be a complete disclosure thereof. For the purpose of the present invention and without any intention to describe the specific details of the structure, it suffices to state that the thermostatic element 28 operates a switch 29—30 through the medium of pivoted levers 31 and 33 and elements 35 and 36 against the action of spring 37. Lever 31 is pivoted at 32 on lever 33, while the latter is pivoted at 34. Adjustable means in the form of a rotatable cam 38 and a roller 39 on lever 33 enable operation of the switch at different temperature levels.

As stated above, the details of the switch actuating mechanism are unimportant in the present case, and the illustration of Fig. 2 is intended merely to indicate that any suitable switch mechanism may be employed in conjunction with the thermostatic element 28.

From the foregoing description, it will be seen that the present invention provides an improved device having the desirable characteristics and features above pointed out. It will be understood, of course, that the invention is not limited to the specific form of the device illustrated but is capable of various modifications within the scope of the appended claims.

I claim:

1. In a cooking apparatus, a heating unit, and a control device constructed and arranged to receive heat by thermal conduction from a cooking vessel placed on said heating unit, said control device including a member adapted to engage the bottom of said vessel, mounting means for said member constructed and arranged to enable said member to adjust itself to the contour of the bottom of said vessel, and a plurality of spaced protuberances on said member, whereby uniform thermal contact between said member and said vessel is assured.

2. In a cooking apparatus, a heating unit, and a control device constructed and arranged to receive heat by thermal conduction from a cooking vessel placed on said heating unit, said control device including a member adapted to engage the bottom of said vessel, mounting means for said member constructed and arranged to enable said member to adjust itself to the contour of the bottom of said vessel, and a trio of substantially equi-spaced protuberances on said member, whereby uniform thermal contact between said member and said vessel is assured.

3. In a cooking apparatus, a heating unit, and a control device constructed and arranged to receive heat by thermal conduction from a cooking vessel placed on said heating unit, said control device including a supporting post, and a unitary structure freely suspended from one end of said post and having a portion constructed to engage the bottom of said vessel at a plurality of spaced points, whereby said structure is self-adjustable according to the contour of the bottom of said vessel and good thermal contact between said portion and said vessel is assured at said points.

4. In a cooking apparatus, a heating unit, and a control device constructed and arranged to receive heat by thermal conduction from a cooking vessel placed on said heating unit, said control device including a supporting post, a yoke freely suspended from one end of said post, and an assembly carried by said yoke and having a portion constructed to engage the bottom of said vessel at a plurality of spaced points, whereby said assembly is self-adjustable according to the contour of the bottom of said vessel and good thermal contact between said portion and said vessel is assured at said points.

5. In a cooking apparatus, a heating unit, and a control device constructed and arranged to receive heat by thermal conduction from a cooking vessel placed on said heating unit, said control device including a single vertical supporting post, and a unitary structure suspended from the top portion of said post and arranged for lateral movement, said structure having a portion adapted to engage the bottom of said vessel at a plurality of spaced points and located near the suspension point, whereby said structure is freely self-adjustable according to the contour of the bottom of the vessel and good thermal contact between said portion and said vessel is assured.

6. In a cooking apparatus, a heating unit, and a control device constructed and arranged to receive heat by thermal conduction from a cooking vessel placed on said heating unit, said control device including a member adapted to engage the bottom of said vessel at a plurality of spaced points, and means for supporting said member for lateral movement about a point located near the said member, whereby said member is freely self-adjustable according to the contour of the bottom of the vessel and good thermal contact between said member and said vessel is assured.

7. In a cooking apparatus, a heating unit, and a control device constructed and arranged to receive heat by thermal conduction from a cooking vessel placed on said heating unit, said control device including a vertical supporting post resiliently mounted for longitudinal movement, and a unitary structure mounted on said post so as to be laterally self-adjustable, said structure having a portion constructed to engage the bottom of said vessel at a plurality of spaced points, whereby said structure is self-adjustable according to the contour of the bottom of said vessel and good thermal contact between said portion and said vessel is assured at said points.

JOSEPH W. MYERS.